US009827863B2

(12) United States Patent
Bartz et al.

(10) Patent No.: US 9,827,863 B2
(45) Date of Patent: Nov. 28, 2017

(54) WIRELESS BATTERY CHARGING SYSTEM HAVING EMERGENCY SHUTDOWN FOR A TRACTION BATTERY OF AN ELECTRIC VEHICLE

(71) Applicant: Continental Automotive GmbH, Hannover (DE)

(72) Inventors: Stephan Bartz, Regensburg (DE); Thoams Roehrl, Barbing (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 162 days.

(21) Appl. No.: 14/843,817

(22) Filed: Sep. 2, 2015

(65) Prior Publication Data
US 2016/0089988 A1 Mar. 31, 2016

(30) Foreign Application Priority Data
Sep. 26, 2014 (DE) ......................... 10 2014 219 504

(51) Int. Cl.
*B60L 11/18* (2006.01)

(52) U.S. Cl.
CPC ......... *B60L 11/182* (2013.01); *B60L 11/1811* (2013.01); *Y02T 10/7005* (2013.01); *Y02T 10/7022* (2013.01); *Y02T 10/7241* (2013.01)

(58) Field of Classification Search
CPC ................ B60L 11/182; B60L 11/1811; Y02T 10/7005; Y02T 10/7022; Y02T 10/7241
See application file for complete search history.

(56) References Cited

U.S. PATENT DOCUMENTS

| 5,709,291 A | * | 1/1998 | Nishino | .................. B60L 5/005 191/10 |
| 6,143,440 A | * | 11/2000 | Volz | .................... H01M 2/1044 429/100 |

(Continued)

FOREIGN PATENT DOCUMENTS

| CN | 102712262 A | 10/2012 | .............. B60L 11/18 |
| CN | 103503261 A | 1/2014 | .............. B60L 11/18 |

(Continued)

OTHER PUBLICATIONS

German Office Action, Application No. 102014219504.7, 7 pages, dated Apr. 14, 2015.

(Continued)

*Primary Examiner* — Naum B Levin
(74) *Attorney, Agent, or Firm* — Slayden Grubert Beard PLLC (57) ABSTRACT

A vehicle-side, electronic charging device of a wireless battery charging system receives, converts and feeds energy into a rechargeable traction battery of an electric vehicle traction motor. The traction battery is charged by an external charging system via a wireless link and the vehicle-side charging device. The vehicle-side charging device includes a first LC resonant circuit between first and second output ports, and a current rectifier having first and second AC voltage inputs and first and second DC voltage outputs. Either (i) the first and second DC voltage outputs of the current rectifier, or (ii) the first and second AC voltage inputs of the current rectifier, or (iii) the first and the second output ports of the first LC resonant circuit, or (iv) a first and a second connection of the reception coil are switchably connected to one another via an actuable kill switch.

9 Claims, 3 Drawing Sheets

(56) References Cited

U.S. PATENT DOCUMENTS

| | | | |
|---|---|---|---|
| 8,890,477 B2 | 11/2014 | Thömmes et al. | 320/109 |
| 9,362,763 B2* | 6/2016 | Chuang | H02J 7/0036 |
| 9,461,479 B2* | 10/2016 | Chae | H02J 5/005 |
| 9,590,445 B2* | 3/2017 | Aerts | H02J 7/0044 |
| 2012/0043931 A1* | 2/2012 | Terao | H02J 7/025 |
| | | | 320/108 |
| 2012/0262109 A1* | 10/2012 | Toya | H01M 10/44 |
| | | | 320/108 |
| 2012/0280655 A1 | 11/2012 | Schneider et al. | 320/109 |
| 2014/0132212 A1 | 5/2014 | Ichikawa et al. | 320/108 |
| 2016/0254659 A1* | 9/2016 | Chambon | B60L 11/182 |

FOREIGN PATENT DOCUMENTS

| | | | |
|---|---|---|---|
| JP | 2011072066 A | 4/2011 | B60L 5/00 |
| JP | 2012044762 A | 3/2012 | B60L 11/18 |
| WO | 2014/053742 A1 | 4/2014 | B60L 11/18 |

OTHER PUBLICATIONS

Chinese Office Action, Application No. 201510619075.2, 9 pages, dated Sep. 5, 2017.

\* cited by examiner

WIRELESS BATTERY CHARGING SYSTEM HAVING EMERGENCY SHUTDOWN FOR A TRACTION BATTERY OF AN ELECTRIC VEHICLE

CROSS-REFERENCE TO RELATED APPLICATIONS

This application claims priority to DE Application No. 10 2014 219 504.7 filed Sep. 26, 2014, the contents of which are hereby incorporated by reference in their entirety.

TECHNICAL FIELD

The present invention relates to the technical field of a wireless, for example induction-based, battery charging system for charging a traction battery of an electric vehicle, comprising a stationary charging apparatus for outputting electromagnetic energy and a vehicle-side, electronic circuit apparatus for receiving, converting and feeding energy into the traction battery, said circuit apparatus interacting with said stationary charging apparatus, and in this case in particular a vehicle-side system for emergency shutdown of a charging operation.

BACKGROUND

Figure 1:
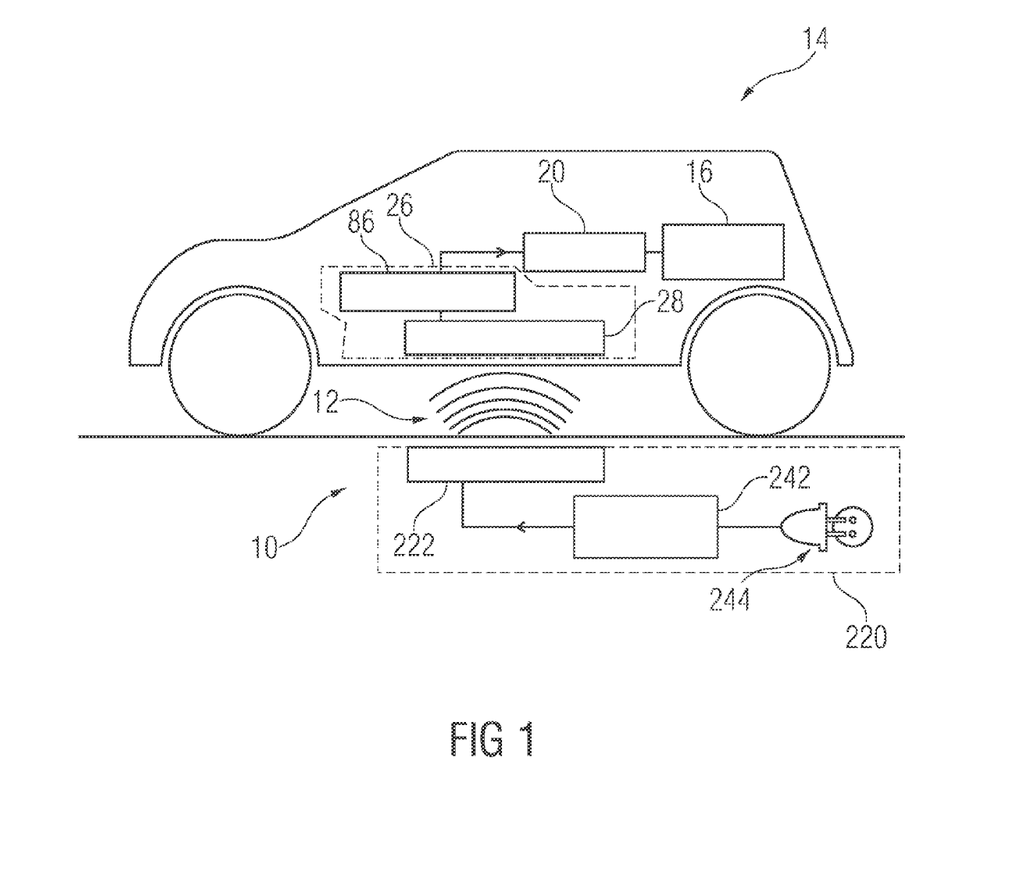
FIG. 1 shows a very schematized block diagram of a conventional wireless battery charging system for charging a traction battery of an electric vehicle.

A conventional wireless battery charging system 10 for charging a rechargeable traction battery 20 for supplying electrical energy to an electric traction motor 16 of an electric vehicle 14 is illustrated schematically in FIG. 1. The system 10 comprises a stationary charging system device 220 and a vehicle-side, electronic charging system device 26. The stationary charging system device 220 serves to transmit energy via a wireless, for example induction-based, link 12 to the vehicle-side charging system device 26 and via said vehicle-side charging system device into the traction battery 20 of the electric vehicle 14. The vehicle-side charging system device 26 in this case serves to receive, convert and feed energy into the traction battery 20.

The vehicle-side charging system device 26 comprises a first LC resonant circuit 28, which is designed to receive energy from the charging device 220, and a rectifier device 86 comprising a current rectifier 96 (see FIG. 2), which is designed to convert an AC electric voltage applied to its AC voltage inputs 98 and 100 (see FIG. 2) into a DC electric voltage provided at its DC voltage outputs 102 and 104 for charging the traction battery 20.

The stationary charging system device 220 comprises a grid supply connection 244, a control device 242 and one or more second LC resonant circuits 222. The stationary charging system device 220 is connected to the public electricity grid via the grid supply connection 244 and can draw electrical energy. Via the control device 242 or controlled thereby, the electrical energy is supplied as AC energy to one of the second LC resonant circuits 222, which is designed to convert the electrical energy into electromagnetic energy and to emit said energy so that some of the electromagnetic energy emitted is received via the wireless link 12 from the first LC resonant circuit 28 acting as receiver, is converted into electrical AC voltage energy and as such is supplied to the current rectifier 96, which converts the energy into DC energy for charging the traction battery 20. The DC voltage energy is fed from the vehicle-side charging system device 26 via the rectifier device 86 into the traction battery 20.

In order that a traction battery 20 can be charged wirelessly via a stationary charging device 220, the electric vehicle 14 finds a parking space where it is parked for the duration of the charging process so that the wireless link 12 can be set up from one of the second LC resonant circuits 222 of the stationary charging system device 220 to the first LC resonant circuit 28 of the vehicle-side charging system device 26. The electric vehicle 14 logs on via a likewise wireless radio link in the stationary charging system device 220 and exchanges various information with respect to the charging process with said stationary charging system device, including the state of charge of its traction battery 20, charging times, available power, power requirement, electric voltages, energy quantity and prices. Furthermore, safety-relevant data, including overvoltages, overheating and other possible system fault states and diagnosis data, are exchanged in both communications directions.

The two units of the battery charging system 10 which are connected wirelessly to one another, namely the stationary charging system device 220 and the electric vehicle 14, can assume states over the course of the charging process which need to be communicated to the respective other unit in order that the other unit can respond correspondingly. Examples of these states are reaching of the end of the charging on the part of the electric vehicle 14 because the maximum voltage of the traction battery 20 has been reached ("battery full"), or a communication that charging needs to be terminated, for example owing to severe cold, or because a component in the electrical vehicle 14 is at risk of being destroyed.

For the case where the radio link is interrupted, for example owing to an externally acting fault, or where a communication communicated by one of the two radio subscribers is interpreted incorrectly by the other radio subscriber, or where the vehicle-side or the charging device-side radio device itself has a fault, there is still no completely safe method for dealing with the fault. A termination request transmitted, for example, from the electric vehicle to the stationary charging system device would not be correctly received by said stationary charging system device or would not be received at all thereby or would be interpreted incorrectly thereby. In this case, there is the risk on the vehicle side of a system part of the battery charging system (see FIG. 1) being irreversibly destroyed or even of the possibility of more hazardous states such as a fire or an explosion, for example, occurring.

In order to reduce these risks, it is conceivable to provide a second, redundant transmission path. However, this possible solution results in additional complexity and costs and nevertheless does not provide complete safety, in particular for the vehicle-side system parts.

A known approach for reducing the risks as regards the operation of the radio link involves the vehicle-side or the charging station-side radio device exchanging so-called live signals at regular time intervals, in a manner comparable to a so-called watchdog method, so that the operation and/or stability of the radio link can be checked regularly. In the event of an absence of a live signal expected at a specific time interval, the system expecting the signal can be transferred to a safe state, for example the power transmission into the wireless link can be shut down on the side of the stationary charging system device 220 or the passing-on of the received power via the current rectifier 96 into the traction battery 20 (see FIG. 2) can be shut down on the side of the electric vehicle 14.

A further known approach for reducing risks is based on the consideration that the two radio subscribers are coupled to one another via the wireless link and one radio subscriber has at least approximate knowledge of the electrical state, including an output or drawn electric power, for example, of the respective other radio subscriber. If the present state changes drastically suddenly owing to a problem or a fault, one radio subscriber can be transferred to a safe state or "blocking state", including, for example, primary power limitation, even without an existing communication link.

Further known approaches for reducing risks or for bringing about a safe state firstly include the connection of discharge resistors in the longitudinal direction of the current retransmission for relieving the current loading on respective downstream components, in the direction of the current flow, i.e. the longitudinal direction of the current retransmission from the first LC resonant circuit 28 acting as receiver via the current rectifier 96 into the traction battery 20, and secondly in the connection of actively switching interrupters, for example contactors, in the longitudinal direction of the current retransmission. Such additionally switched interrupters, in particular contactors, have the disadvantage that they are relatively large, heavy and expensive and that overvoltage peaks may occur in the first LC resonant circuit 28 during implementation of a switching operation, i.e. interruption of the current retransmission in the longitudinal direction thereof.

SUMMARY

One embodiment provides a vehicle-side, electronic charging system device of a wireless battery charging system, for receiving, converting and feeding energy into a rechargeable traction battery for supplying electrical energy to an electric traction motor of an electric vehicle, wherein the traction battery can be supplied with electrical energy for charging the traction battery from an external charging system device via a wireless, in particular induction-based, link and the vehicle-side charging system device, wherein the vehicle-side charging system device comprises the following: a first LC resonant circuit comprising a first coil, which is in the form of a reception coil, is arranged and/or designed for receiving electromagnetic energy and has a first and a second connection, and also comprising a first capacitor, a first output port and a second output port, wherein the first output port is electrically conductively connected to the second output port via the first capacitor and the first coil in a series circuit or a parallel circuit thereof; and a current rectifier, which has a first and a second AC voltage input on the input side and a first and a second DC voltage output on the output side, wherein: the current rectifier is designed to convert an AC electric voltage which can be applied between the first and second AC voltage inputs into a DC electric voltage which can be provided between the first and second DC voltage outputs; the first AC voltage input is directly or indirectly electrically conductively connectable via the first output port to the first capacitor and the second AC voltage input is directly or indirectly electrically conductively connectable via the second output port to the first coil; the first DC voltage output is directly or indirectly electrically conductively connectable to a first port of the traction battery and the second DC voltage output is directly or indirectly electrically conductively connectable to a second port of the traction battery, wherein (i) the first and second DC voltage outputs of the current rectifier the first and second AC voltage inputs of the current rectifier the first and the second output ports of the first LC resonant circuit and/or (iv) the first and the second connections of the first coil are electrically conductively connectable switchably to one another via an actuable switch of a kill switch.

In a further embodiment, the kill switch has a third overcurrent protection device and an actuable, third switch, and wherein, in the configuration in which the first and the second output ports of the first LC resonant circuit are electrically conductively connectable switchably to one another via the actuable third switch of the kill switch, the third overcurrent protection device is connected in series on a link between the first connection of the first coil and the first output port or the third overcurrent protection device is connected in series on a link between the second connection of the first coil and the second output port of the first LC resonant circuit.

In a further embodiment, the kill switch has a fourth overcurrent protection device and an actuable, fourth switch, and wherein, in a configuration in which the first and second connections of the first coil are electrically conductively connectable switchably to one another via the actuable fourth switch of the kill switch, the fourth overcurrent protection device is connected in series on a link between the first connection of the first coil and the first output port or the fourth overcurrent protection device is connected in series on a link between the second connection of the first coil and the second output port of the first LC resonant circuit.

Another embodiment provides an electrical rectifier device for use in a vehicle-side charging system device of a wireless battery charging system, wherein the vehicle-side charging system device is designed to receive, convert and feed energy into a rechargeable traction battery for supplying electrical energy to an electric traction motor of an electric vehicle, wherein the traction battery can be supplied with electrical energy for charging the traction battery from an external charging system device via a wireless, in particular induction-based, link and the vehicle-side charging system device using the rectifier device, wherein: the rectifier device has a first and a second AC voltage input port on the input side and a first and a second DC voltage output port and a current rectifier on the output side; the current rectifier has a first and a second AC voltage input on the input side and a first and a second DC voltage output on the output side; the current rectifier is designed to convert an AC electric voltage which can be applied between the first and second AC voltage inputs into a DC electric voltage which can be provided between the first and second DC voltage outputs; the first AC voltage input port is electrically conductively connected to the first AC voltage input of the current rectifier and the second AC voltage input port is electrically conductively connected to the second AC voltage input of the current rectifier; and the first DC voltage output port is electrically conductively connected to the first DC voltage output of the current rectifier and the second DC voltage output port is electrically conductively connected to the second DC voltage output of the current rectifier, wherein: (i) the first and the second DC voltage outputs of the current rectifier and/or (ii) the first and second AC voltage inputs of the current rectifier are electrically conductively connectable switchably to one another via an actuable switch of a kill switch.

In a further embodiment, the kill switch has a first overcurrent protection device and an actuable, first switch, and wherein, in a configuration in which the first and second DC voltage outputs of the current rectifier are electrically conductively connectable switchably to one another via the actuable first switch of the kill switch, the first overcurrent protection device is connected in series on a link between the first DC voltage output and the first DC voltage output port or the first overcurrent protection device is connected in series on a link between the second DC voltage output and the second DC voltage output port and in conjunction with the second DC voltage output.

In a further embodiment, the kill switch has a second overcurrent protection device and an actuable, second switch, and wherein, in a configuration in which the first and second AC voltage inputs of the current rectifier are electrically conductively connectable switchably to one another via the actuable second switch of the kill switch, the second overcurrent protection device is connected in series on a link between the first AC voltage input and the first AC voltage input port or the second overcurrent protection device is connected in series on a link between the second AC voltage input and the second AC voltage input port.

In a further embodiment, a kill switch is designed in such a way that if its actuable switch is switched over from an open state to a closed state, a charging current is dissipated through its overcurrent protection device by the closed switch substantially without any resistance and, as a result, increases up to above a protection device threshold value of the overcurrent protection device, with the result that the overcurrent protection device responds and transfers from a closed state to an open state and the charging current is thus interrupted.

In a further embodiment, the electrical rectifier device has a control and monitoring device, which is designed to switch over a respective kill switch from an open state to a closed state when, in response to a request to terminate the charging operation which is directed and transmitted from the C&M device to an external charging system device, feedback from the external charging system device with confirmation that the charging operation has been terminated does not arrive at the C&M device within a predetermined period of time, which begins with the time of the transmission of the request.

In a further embodiment, the C&M device is designed to perform one or more of the following functions: monitoring a charge voltage of the traction battery, monitoring a charge current of the traction battery, monitoring a temperature of the traction battery, monitoring a temperature of the current rectifier, monitoring a temperature of an electric shock protection discharge resistor, monitoring a state signal generated by the charging device which is indicative of whether a correct state or correct operation of the charging device is present or not, monitoring an interlock signal which is routed on a first and second interlock signal line which connects the C&M device to a plug-type connector on the rectifier device side which contains the first and second AC voltage input ports, and is indicative of whether an electrical plug-type connection has been produced between the first and second output ports, on the one hand, and the first and second AC voltage input ports, on the other hand, or not, and monitoring one or more state signals fixed in advance which are indicative of whether correct operation or a correct state of the electric vehicle or correct operation or a correct state of a generating set of the electric vehicle is present or not and which are supplied to the C&M device via a vehicle bus system, to which the C&M device can be connected.

In a further embodiment, the C&M device is designed to transmit wirelessly a request signal to terminate the charging operation which is directed to a charging device when one of the monitoring functions discussed above detects an incorrect state or incorrect operation.

In a further embodiment, an actuable switch of a kill switch and/or the actuable switch of the DC-link discharge device has a semiconductor-based switch or a mechanical switch.

In a further embodiment, an overcurrent protection device of a kill switch has a fuse or a temperature-dependent, reversible interruption element.

Another embodiment provides a stationary charging system device of a wireless battery charging system, wherein said stationary charging system device is designed to transmit energy to a vehicle-side, electronic charging system device as disclosed above for charging a traction battery of an electric vehicle, and wherein said stationary charging system device is designed and has means for receiving a request signal output by the vehicle-side charging system device and evaluating the state thereof and, after a time after which the state of the signal can be interpreted as a request to the stationary charging system device to terminate a charging operation, for terminating the charging operation by ending the transmission of energy within a predetermined period of time and outputting a confirmation signal which is indicative of the fact that the charging operation has been terminated.

In a further embodiment, a second LC resonant circuit comprising a transmission coil for outputting electromagnetic energy, a capacitor assigned to the transmission coil and an actuable device having a switching function, such as, for example, an actuably switchable inverter, which device is arranged in series with the transmission coil and the capacitor assigned thereto or between the transmission coil and the capacitor and can be switched over from a closed state to an open state, and vice versa, wherein the stationary charging system device is designed to switch over the device with the switching function within the predetermined time from the closed state to the open state once the state of the request signal can be interpreted as a request to the stationary charging system device to terminate the charging operation.

BRIEF DESCRIPTION OF THE DRAWINGS

Example embodiments are discussed in detail below with reference to the drawings, in which.

DETAILED DESCRIPTION

Embodiments of the present invention provide a wireless battery charging system comprising a stationary charging system device (charging station) and a vehicle-side, electronic charging system device of the battery charging system of the type mentioned at the outset for receiving, converting and feeding energy into a traction battery, wherein vehicle-side components of the system which are in particular in need of protection are protected by means of an emergency shutdown system, which acts safely and with complete current interruption, brings about a low level of additional complexity in terms of production and enables quick and inexpensive reinstatement after an emergency shutdown.

Some embodiments provide a vehicle-side, electronic charging system device of a wireless battery charging system is provided, wherein the charging system device serves to receive, convert and feed energy into a rechargeable traction battery for supplying electrical energy to an electric traction motor of an electric vehicle. In the wireless battery charging system, electrical energy for charging the traction battery is supplied to the traction battery from an external charging system device via a wireless, in particular induction-based, link and the vehicle-side charging system device. The disclosed vehicle-side charging system device has a first LC resonant circuit and a current rectifier. The first LC resonant circuit comprises a first coil which is in the form of a reception coil, is arranged and/or designed for receiving electromagnetic energy and has a first and a second connection, and also comprises a first capacitor, a first output port and a second output port. The first output port is electrically conductively connected to the second output port via the first capacitor and the first coil in a series circuit thereof or in a parallel circuit thereof. The current rectifier has a first and a second AC voltage input on the input side and a first and a second DC voltage output on the output side and is designed to convert an AC electric voltage which can be applied between the first and second AC voltage inputs into a DC electric voltage which can be provided between the first and second DC voltage outputs. The first AC voltage input is directly or indirectly electrically conductively connectable via the first output port to the first capacitor and the second AC voltage input is directly or indirectly electrically conductively connectable via the second output port to the first coil. The first DC voltage output is directly or indirectly electrically conductively connectable to a first port of the traction battery and the second DC voltage output port is directly or indirectly electrically conductively connectable to a second port of the traction battery.

In accordance with particular embodiments:
in a first embodiment (i) the first and second DC voltage outputs of the current rectifier or
in a second embodiment (ii) the first and second AC voltage inputs of the current rectifier or
in a third embodiment (iii) the first and second output ports of the first LC resonant circuit and/or
in a fourth embodiment (iv) the first and second connections of the first coil
are electrically conductively connectable switchably to one another via a driveable switch of a kill switch.

In this way the first coil, the first LC resonant circuit, the DC voltage output side of the current rectifier and/or the AC voltage input side of the current rectifier, and therefore the comparatively expensive components (LC resonant circuit and current rectifier) of the vehicle-side circuit apparatus, have individual intrinsic protection, to be precise in the form of a kill switch, i.e. an actuable emergency shutdown device, which effects safe and complete current interruption, is inexpensive in terms of manufacture and comprises a replaceable and inexpensive overcurrent protection device, with the result that, after an emergency shutdown, simple and inexpensive reinstatement of the emergency shutdown device is possible.

The kill switch can have a third overcurrent protection device and an actuable third switch. In the embodiment (iii) in which the first and second output ports of the first LC resonant circuit are electrically conductively connectable switchably to one another via the actuable third switch of the kill switch, the third overcurrent protection device can be connected in series on a link between the first connection of the first coil and the first output port or in series on a link between the second connection of the first coil and the second output port of the first LC resonant circuit.

As an alternative or in addition to this, the kill switch can have a fourth overcurrent protection device and an actuable, fourth switch. In the embodiment (iv) in which the first and second connections of the first coil are electrically conductively connectable switchably to one another via the actuable fourth switch of the kill switch, the fourth overcurrent protection device can be connected in series on a link between the first connection of the first coil and the first output port or in series on a link between the second connection of the first coil and the second output port of the first LC resonant circuit.

Other embodiments provide an electrical rectifier device for use in a vehicle-side charging system device of a wireless battery charging system. In this case, the vehicle-side charging system device is designed to receive, convert and feed energy into a rechargeable traction battery for supplying electrical energy to an electric traction motor of an electric vehicle. The traction battery can be supplied with electrical energy for charging the traction battery from an external charging system device via a wireless, in particular induction-based, link and the vehicle-side charging system device with the rectifier device.

The rectifier device has a first and a second AC voltage input port on the input side and a first and a second DC voltage output port and a current rectifier on the output side. The current rectifier has a first and a second AC voltage input on the input side and a first and a second DC voltage output on the output side. The current rectifier is designed to convert an AC electric voltage which can be applied between the first and second AC voltage inputs into a DC electric voltage which can be provided between the first and second DC voltage outputs. The first AC voltage input port is electrically conductively connected to the first AC voltage input of the current rectifier and the second AC voltage input port is electrically conductively connected to the second AC voltage input of the current rectifier. In addition, the first DC voltage output port is electrically conductively connected to the first DC voltage output of the current rectifier and the second DC voltage output port is electrically conductively connected to the second DC voltage output of the current rectifier.

In accordance with particular embodiments:
in a first embodiment (i), the first and second DC voltage outputs of the current rectifier or
in a second embodiment (ii), the first and second AC voltage inputs of the current rectifier
are electrically conductively connectable switchably to one another via an actuable switch of a kill switch.

The wireless link can be an induction-based link, and the battery charging system can be a so-called induction charging system for electric vehicles.

In the charging system device in accordance with the first aspect or in the rectifier device in accordance with the second aspect, the kill switch can have a first overcurrent protection device and an actuable, first switch. In the embodiment (i) in which the first and second DC voltage outputs of the current rectifier are electrically conductively connectable switchably to one another via the actuable switch of the first kill switch, the first overcurrent protection device can be connected in series on a link between the first DC voltage output and the first DC voltage output port or in series on a link between the second DC voltage output and the second DC voltage output port and in conjunction with the second DC voltage output.

In the charging system device in accordance with the first aspect or in the rectifier device in accordance with the second aspect, the kill switch can have a second overcurrent protection device and an actuable, second switch. In the embodiment (iv) in which the first and second AC voltage inputs of the current rectifier are electrically conductively connectable switchably to one another via the actuable second switch of the kill switch, the second overcurrent protection device can be connected in series on a link between the first AC voltage input and the first AC voltage input port or in series on a link between the second AC voltage input and the second AC voltage input port.

In the charging system device in accordance with the first aspect or in the rectifier device in accordance with the second aspect, a kill switch can be designed in a respective installation arrangement or embodiment such that when its actuable switch is switched over from an open (i.e. off) state to a closed (i.e. on) state, a charge current is dissipated through its overcurrent protection device by the closed switch substantially without any resistance and, as a result, increases up to beyond a safety threshold value of the overcurrent protection device, with the result that the overcurrent protection device responds and transfers from a closed (i.e. on) state into an open (i.e. off) state and the charge current is thus interrupted.

An overcurrent protection device and an actuable switch are comparatively inexpensive elements in comparison with the components to be protected (first LC resonant circuit and current rectifier).

The electrical rectifier device can have a control and monitoring (C&M) device, which is designed to switch over a respective kill switch from an open (i.e. off) state to a closed (i.e. on) state when, in response to a request to terminate the charging operation which is directed and transmitted from the C&M device to an external charging device, feedback from the charging device with confirmation that the charging operation has been terminated does not arrive at the C&M device within a predetermined period of time, which begins with the time of the transmission of the request. In this way, the components connected downstream of the respective kill switch are protected from overcharging, overvoltage or overcurrent in the longitudinal direction of the current retransmission in the event of an interruption of the wireless link between the vehicle-side circuit apparatus and the charging device.

The C&M device can perform various monitoring and circuit functions. In particular, it can be designed to perform one or more of the following functions:
  monitoring a charge voltage of the traction battery,
  monitoring a charge current of the traction battery,
  monitoring a temperature of the traction battery,
  monitoring a temperature of the current rectifier,
  monitoring a temperature of an electric shock protection discharge resistor,
  monitoring a state signal generated by the charging device which is indicative of whether a correct state or correct operation of the charging device is present or not,
  monitoring an interlock signal which is routed on a first and second interlock signal line which connects the C&M device to a plug-type connector on the rectifier device side which contains the first and second AC voltage input ports, and is indicative of whether the electrical plug-type connection has been produced between the first and second output ports, on the one hand, and the first and second AC voltage input ports, on the other hand, or not, and
  monitoring one or more state signals fixed in advance which are indicative of whether correct operation or a correct state of the electric vehicle or correct operation or a correct state of a generating set of the electric vehicle is present or not and which are supplied to the C&M device via a vehicle bus system, to which the C&M device can be connected.

The C&M device can furthermore be designed to transmit wirelessly a request signal to terminate the charging operation which is directed to a charging device when one of the abovementioned monitoring functions detects an incorrect state or incorrect operation.

The electrical rectifier device can furthermore have one or more of the following elements:
  a first filter device, which is designed to filter a first AC voltage component out of the output signal of the current rectifier;
  a second filter device, which is designed to filter a second AC voltage component out of the output signal of the first filter device;
  an electric shock protection device, which is designed to quickly decay a hazardous voltage level for the human body at the output of the rectifier device in order to avoid, for example, mechanics suffering any damage to their body during repair work on the rectifier device, said electric shock protection device comprising a DC-link discharge resistor and an actuable switch, which is connected in series therewith and is assigned thereto, wherein this series circuit has a first and a second connection, which is opposite the first connection, and wherein the first connection is electrically conductively connected to the first DC voltage output port of the electrical rectifier device and the second connection is electrically conductively connected to ground;
  a voltage measurement device, which is designed to detect a voltage state of the traction battery;
  an interlock detection device, which is designed to supply an interlock signal to the C&M device which is indicative of whether an electrical plug-type connection has been produced between the first and second output ports of the first LC resonant circuit, on the one hand, and the first and second AC voltage input ports of the electrical rectifier device, on the other hand, or not;
  a first temperature measurement device, which is designed and arranged to measure a temperature of the current rectifier and to supply a first temperature measurement signal to the C&M device which is indicative of the temperature of the current rectifier;
  a second temperature measurement device, which is designed and arranged to measure a temperature of a DC-link discharge resistor and to supply a second temperature measurement signal to the C&M device which is indicative of the temperature of the DC-link discharge resistor; and
  a bus port for connection to a vehicle bus system and an interface, which is connected between the C&M device and the bus port or is integrated in the C&M device, via the bus port to the vehicle bus system.

The first filter device can be in the form of a low-pass filter and have a first and a second input, a first and a second output, a second coil comprising a first and a second connection and a second capacitor comprising a first and a second connection. The first connection of the second coil can be electrically conductively connected directly or indirectly to the first DC voltage output of the current rectifier via the first input of the low-pass filter, and the second connection of the second coil can be electrically conductively connected to the first DC voltage output port of the electrical rectifier device via the first output of the low-pass filter. The first connection of the second capacitor can be electrically conductively connected to the second connection of the second coil, and the second connection of the second capacitor can be electrically conductively connected to ground.

The second filter device can be in the form of a third capacitor and have a first and a second connection. The first connection can be electrically conductively connected to the first DC voltage output port of the electrical rectifier device, and the second connection can be electrically conductively connected to ground.

The electric shock protection device can have an electric shock protection discharge resistor and an actuable switch, which is connected in series therewith and is assigned thereto. This series circuit can have a first connection and a second connection opposite the first connection, wherein the first connection can be electrically conductively connected to the first DC voltage output port of the electrical rectifier device, and the second connection can be electrically conductively connected to ground.

The high-voltage measurement device can have a first and a second connection. The first connection can be electrically conductively connected to a first connection terminal of the traction battery, and the second connection can be electrically conductively connected to a second connection terminal of the traction battery. As an alternative or in addition, the first connection can be electrically conductively connected to the first DC voltage output port of the electrical rectifier device, and the second connection can be electrically conductively connected to ground.

The electric shock protection device can comprise an electric shock protection discharge resistor and an actuable switch connected in series therewith. This series circuit can have a first connection and a second connection opposite the first connection. In this case, the first connection can be electrically conductively connected to the first DC voltage output port of the electrical rectifier device, and the second connection can be electrically conductively connected to ground. By means of such an electric shock protection device, it can be ensured, via the electric shock protection discharge resistor, for example after a charging operation, that there is no longer the possibility of a voltage being present at the output of the rectifier device which is hazardous to the human body. For this purpose, the output-side capacitances of the rectifier device need to be discharged in a controlled manner, i.e. in a manner avoiding an overcurrent, via the electric shock protection discharge resistor.

A respective actuable switch of any of the abovementioned kill switches and/or the actuable switch of the DC-link discharge device can comprise a semiconductor-based switch or a mechanical switch. Both variant configurations of an actuable switch are technically sophisticated and relatively inexpensive elements, in comparison with the components to be protected. Such a switch is easily actuable and reusable in a manner known to a person skilled in the art via a respective switching signal line leading to the switch. Owing to the fact that such a switch is only in operation (switched on) for a short period of time up to triggering of the overcurrent protection device, it can have comparatively compact dimensions and be comparatively inexpensive.

A respective overcurrent protection device for any of the abovementioned kill switches can comprise a fuse or a temperature-dependent, reversible interruption element. Both variant configurations of an overcurrent protection device are likewise technically sophisticated and relatively inexpensive elements, in comparison with the components to be protected. Such a protection device can be replaced by a new one or reset by a person skilled in the art quickly and inexpensively after triggering or activation of a kill switch, with the result that the electric vehicle is again ready for use.

Other embodiments provide a stationary charging system device of a wireless battery charging system, which is designed for transmitting energy to a vehicle-side electronic charging system device in accordance with the first aspect which is designed for charging a traction battery of an electric vehicle.

The stationary charging system device is designed and has corresponding means for receiving a request signal output by the vehicle-side charging system device and evaluating the state of said request signal and, after a time after which the state of the signal can be interpreted as a request to the stationary charging system device to terminate a charging operation, for terminating the charging operation by ending the transmission of energy within a predetermined period of time and transmitting a confirmation signal which is indicative of the fact that the charging operation has been terminated. In this way, the stationary charging system device is designed for interacting with the disclosed vehicle-side charging system device. That is to say that, when the vehicle-side charging system device transmits a charge termination signal, the implementation of which by the stationary charging system device is not confirmed within the predetermined period of time, the C&M device can then interpret from this that the radio link has been interrupted or that there is a fault in the stationary charging system device and can correspondingly transfer the vehicle-side charging system device into a safe state, including triggering of an emergency shutdown of the current flow by means of a kill switch.

The stationary charging system device can comprise a second LC resonant circuit comprising a transmission coil for outputting electromagnetic energy, a capacitor assigned to the transmission coil and an actuable device having a switching function. The device having the switching function can be arranged with the transmission coil and the capacitor assigned thereto in series or between the transmission coil and the capacitor and is designed to be switched over from a closed, i.e. on state into an open, i.e. off state, and vice versa. In addition, the stationary charging system device can be designed to switch over the device having the switching function from the closed state to the open state within the predetermined time once the state of the request signal can be interpreted as a request to the stationary charging system device to terminate the charging operation.

Overall, embodiments of the invention provide a wireless battery charging system that ensures safe current interruption of the charging current because substantially every safety-relevant parameter is monitored digitally via a corresponding system of sensors, and in said battery charging system complete current interruption of the charge current can be triggered on the vehicle side with only a low level of additional complexity, namely connection of inexpensive kill switches, and can be reinstated with little complexity or with few maneuvers or electronic resetting of a switch.

Reference is made to the fact that embodiments of the invention have been described with reference to different subjects of the invention. However, it will be immediately clear to a person skilled in the art on reading this application that, if not explicitly specified otherwise, in addition to a combination of features which belong to a type of subject matter according to the invention, any desired combination of features which belong to different types of subjects according to the invention is also possible.

Reference is made to the fact that the embodiments described below merely represent a restricted selection of possible variant embodiments of the invention. It is thus possible to combine the features of individual embodiments with one another in a suitable manner, with the result that a multiplicity of various embodiments can be regarded by a person skilled in the art as being disclosed in an obvious manner by means of the variant embodiments explicit here.

Figure 2:
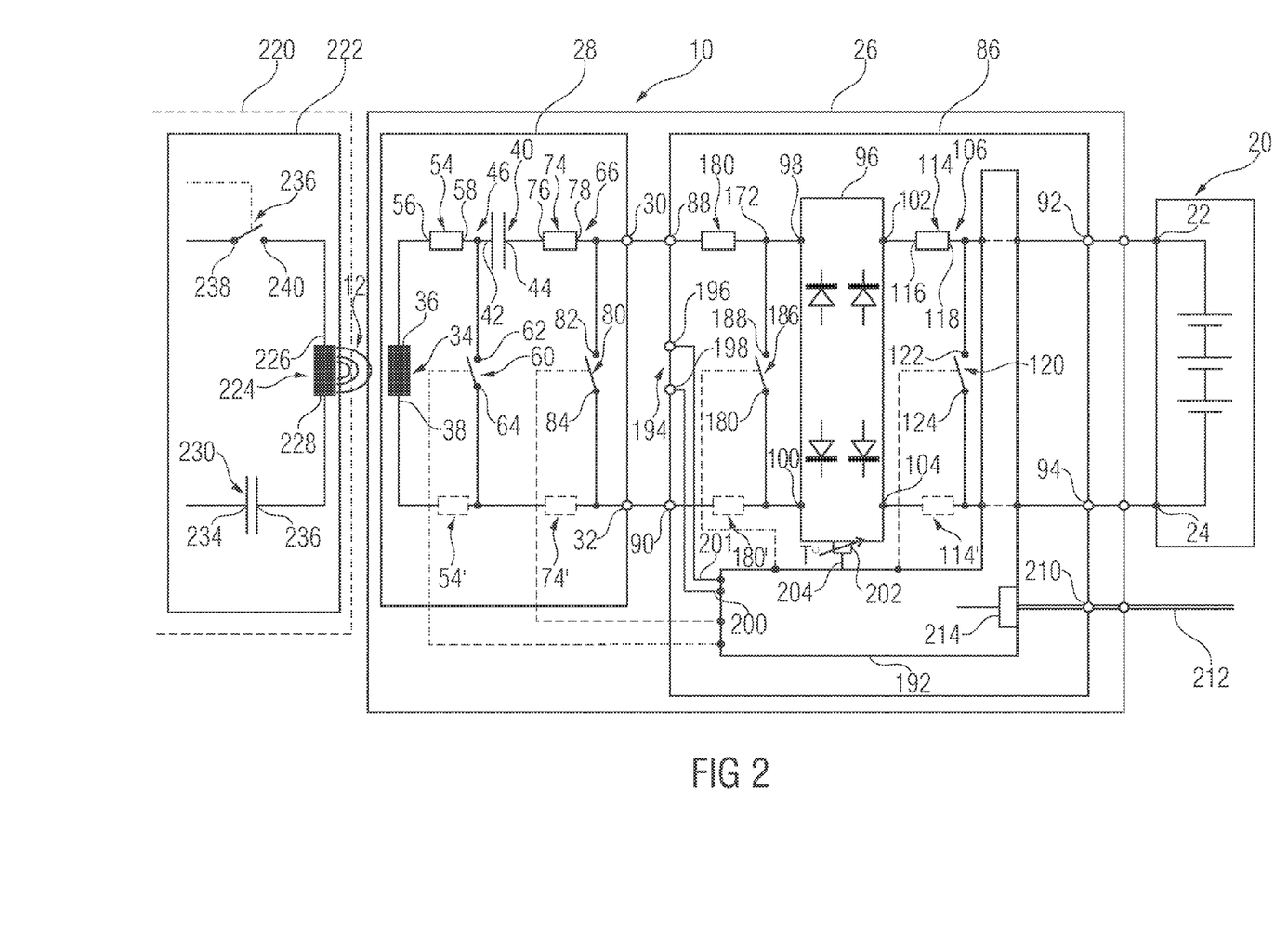
FIG. 2 shows a basic circuit diagram of an embodiment of a vehicle-side, electronic charging system device, including a rectifier device of the battery charging system comprising an emergency shutdown system in accordance with an embodiment of the invention.

The wireless battery charging system 10 shown in FIG. 2 comprises a stationary charging system device 220 and a vehicle-side charging system device 26, which are coupled to one another and can communicate with one another via a wireless link 12. The stationary charging system device 220 of the wireless battery charging system 10 is used for transmitting electromagnetic energy to the vehicle-side, electronic charging system device 26. The vehicle-side charging system device 26 is used for receiving the electromagnetically transmitted energy, for converting the electromagnetic energy into electrical energy and for feeding the electrical energy into a rechargeable traction battery 20 for supplying electrical energy to an electric traction motor 16 of an electric vehicle 14. Thus, the traction battery 20 can be supplied with electrical energy for charging the stationary charging system device 220 via the wireless link 12 and the vehicle-side charging system device 26.

The vehicle-side charging system device 26 has a first LC resonant circuit 28 and a current rectifier 96. The first LC resonant circuit 28 comprises a first capacitor 40 and a first coil 34, which is in the form of a reception coil is used for, for receiving the electromagnetic energy emitted by the charging device 220, and has a first and a second connection 36 and 38. In addition, the first LC resonant circuit 28 has a first output port 30 and a second output port 32. As shown in FIG. 2, the first output port 30 is electrically conductively connected to the second output port 32 via the first capacitor 40 and the first coil 34, which are connected in a series circuit. As an alternative, the first coil 34 and the first capacitor 40 could be connected in a parallel circuit, and the first and second output ports 30 and 32 could be electrically conductively connected via this parallel circuit (not shown).

Figure 3:
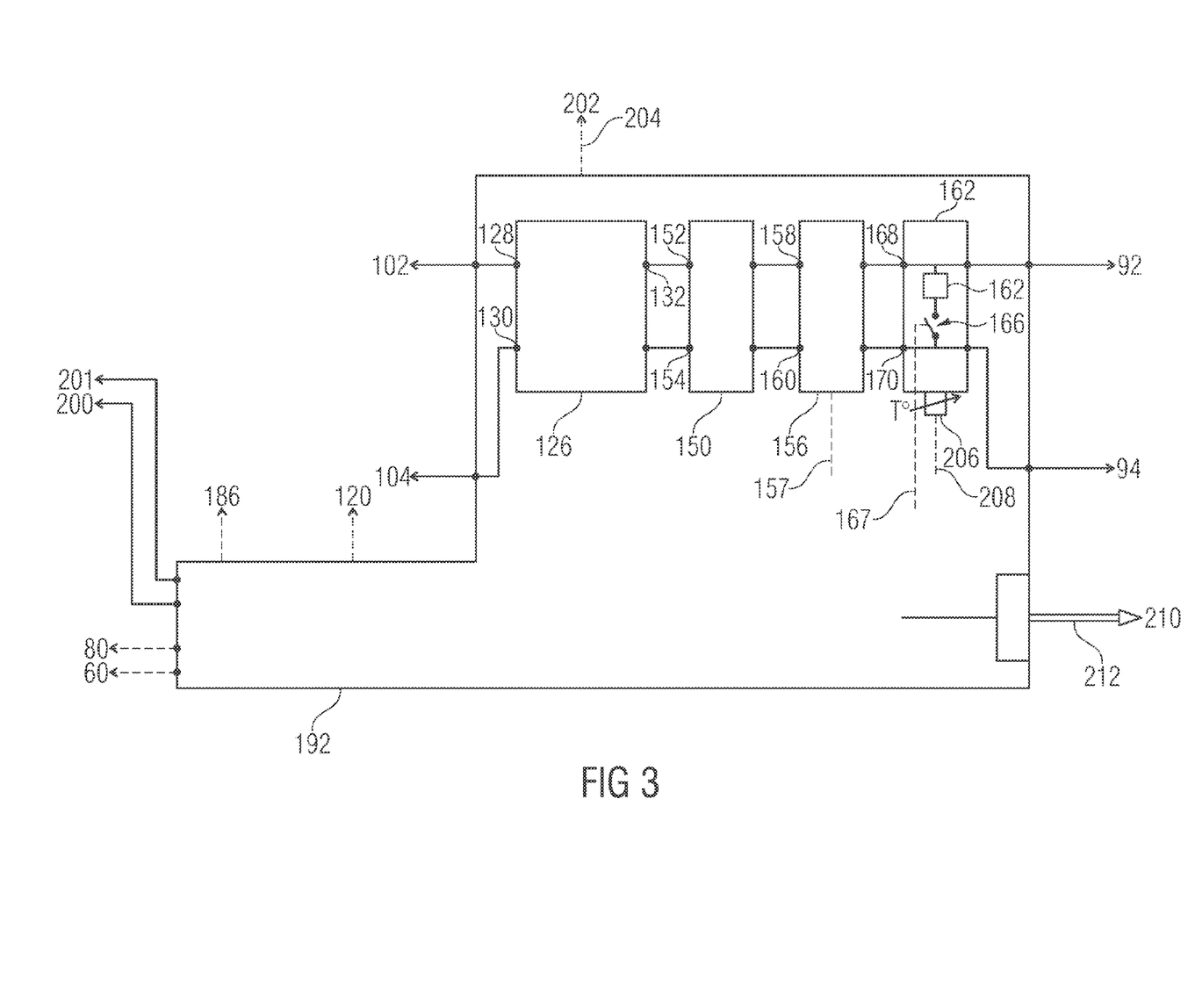
FIG. 3 shows a block circuit diagram of a control and monitoring device in an embodiment of a vehicle-side, electronic charging system device.

The current rectifier 96 has a first and a second AC voltage input 98 and 100 on the input side and a first and a second DC voltage output 102 and 104 on the output side. The current rectifier 96 is designed to convert an AC electric voltage applied between the first and second AC voltage inputs 98 and 100 into a DC electric voltage provided between the first and second DC voltage outputs 102 and 104. The first AC voltage input 98 is electrically conductively connected to the first capacitor 40 via the first output port 30 indirectly via an overcurrent protection device 74 (explained further below) as shown in FIG. 2 or directly (not shown). The second AC voltage input 100 is electrically conductively connected via the second output port 32 to the first coil 34 directly, as shown in FIG. 2, or indirectly (not shown). Furthermore, the first DC voltage output 102 is electrically conductively connected to a first port 22 of the traction battery 20 and the second DC voltage output 104 is electrically conductively connected to a second port 24 of the traction battery 20, in each case indirectly, via downstream components 126, 150, 156 and 162 (explained further below) of a control and monitoring device 192, which is shown in FIG. 3, or directly (not shown).

In a first embodiment (i), the first and second DC voltage outputs 102 and 104 of the current rectifier 96 and/or, in a second embodiment (ii), the first and second AC voltage inputs 98 and 100 of the current rectifier 96 and/or, in a third embodiment (iii), the first and second output ports 30 and 32 of the first LC resonant circuit 28 and/or, in a fourth embodiment (iv), the first and second electrically conductively connectable switchably to one another via an actuable switch 60, 80, 120, 186 of a kill switch 46, 66, 106, 172 in an installation position assigned to the respective embodiment.

In FIG. 2, actuable switches 60, 80, 120 and 186 are shown in four installation positions of kill switches 46, 66, 106 and 172 in four embodiments. Provision is made for, in one implementation of a vehicle-side charging system device 26, in each case only one actuable switch 60, 80, 120 and 186 to be contained in a selected on of the possible installation positions of a kill switch in a selected one of the four embodiments.

In the embodiment (iii) in which the first and second output ports 30 and 32 of the first LC resonant circuit 28 are electrically conductively connected switchably to one another via the third actuable switch 80 of the kill switch 66 in accordance with the embodiment (iii), the kill switch 66 comprises a third overcurrent protection device 74, 74', which has a first and a second connection 76 and 78, and furthermore comprises the actuable, third switch 80, which has a first and a second connection 82 and 84.

In the embodiment (iii), in a first possible installation position of the third overcurrent protection device 74, the first connection 76 thereof is electrically conductively connected to the first capacitor 40 and the second connection 78 of said third overcurrent protection device is electrically conductively connected to the first output port 30. In addition, the first connection 82 of the third switch 80 is electrically conductively connected to the second connection 78 of the third overcurrent protection device 74 and the second connection 84 of said third switch is electrically conductively connected to the second output port 32.

In the embodiment (iii), in a second possible installation position of the third overcurrent protection device 74', a first connection thereof is electrically conductively connected to the first connection 38 of the first coil 34 and the second connection of said third overcurrent protection device is electrically conductively connected to the second output port 32. In addition, the first connection 82 of the third switch 80 is electrically conductively connected to the first output port 30 and the second connection 84 of said third switch is electrically conductively connected to the second output port 32 and the second connection of the third overcurrent protection device 74'.

The kill switch 66 in accordance with the third embodiment (iii) is connected downstream of the first LC resonant circuit 28 and protects the components 96, 126, 150, 156 and 162 (explained further below) which are connected downstream in the current flow to the traction battery 20.

In the embodiment (iv) in which the first and second connections 36 and 38 of the first coil 34 are electrically conductively connected switchably to one another via the actuable fourth switch 60 of the kill switch 46 in accordance with the embodiment (iv), the kill switch 46 comprises a fourth overcurrent protection device 54, 54', which has a first and a second connection 56 and 58, and in addition comprises the actuable, fourth switch 60, which has a first and a second connection 62 and 64.

In the embodiment (iv), in a first possible installation position of the fourth overcurrent protection device 54, the first connection 56 thereof is electrically conductively connected to the first connection 36 of the first coil 34 and the second connection 58 of said fourth overcurrent protection device is electrically conductively connected to the first connection 42 of the first capacitor 40. In addition, the first connection 62 of the fourth switch 60 is electrically conductively connected to the second connection 58 of the fourth overcurrent protection device 54 and the second connection 64 of said fourth switch is electrically conductively connected to the second output port 32.

In the embodiment (iv), in a second possible installation position of the fourth overcurrent protection device 54', the first connection thereof is electrically conductively connected to the second connection 38 of the first coil 34 and the second connection 58 of said fourth overcurrent protection device is electrically conductively connected to the second connection 64 of the fourth switch 60 and to the second connection port 32. In addition, the first connection 62 of the fourth switch 60 is electrically conductively connected to the first connection 36 of the first coil 34 and the first connection 42 of the first capacitor, and the second connection 64 of said fourth switch is electrically conductively connected to the second output port 32.

The kill switch 46 in accordance with the fourth embodiment (iv) is connected downstream of the first coil 34 in the first LC resonant circuit 28 and protects the first capacitor 40, which is connected downstream in the current flow to the traction battery 20, the current rectifier 96, which is connected downstream in the current flow to the traction battery 20, and the further components 126, 150, 156 and 162 of a control and monitoring device 192 (explained further below with reference to FIG. 3), which are connected downstream in the further current flow to the traction battery 20.

In the embodiment (i) in which the first and second DC voltage outputs 102 and 104 of the current rectifier 96 are electrically conductively connected switchably to one another via the actuable first switch 120 of the kill switch 106 in accordance with the embodiment (i), the kill switch 106 comprises a first overcurrent protection device 114, 114', which has a first and a second connection 116 and 118, and in addition comprises the actuable, first switch 120, which has a first and a second connection 122 and 124.

In the embodiment (i), in a first possible installation position of the first overcurrent protection device 114, the first connection 116 thereof is electrically conductively connected to the first DC voltage output 102 of the current rectifier 96, and the second connection 118 of said first overcurrent protection device is electrically conductively connected to the first connection 112 of the first actuable switch 120. In addition, the first connection 112 of the first switch 120 is electrically conductively connected to the first input 128 of the low-pass filter 126, and the second connection 124 of said first switch is electrically conductively connected to the second DC voltage output 104 of the current rectifier 96 and the second input 130 of the low-pass filter 126.

In the embodiment (i), in a second possible installation position of the first overcurrent protection device 114', the first connection thereof is electrically conductively connected to the second DC voltage output 104 of the current rectifier 96, and the second connection of said first overcurrent protection device is electrically conductively connected to the second input 130 of the low-pass filter 126. In addition, the first connection 112 of the first switch 120 is electrically conductively connected to the first DC voltage output 102 of the current rectifier 96 and the first input 128 of the low-pass filter 126, and the second connection 124 of said first switch is electrically conductively connected to the second connection of the first overcurrent protection device 114' and the second input 130 of the low-pass filter 126.

The kill switch 106 in the embodiment (i) is therefore connected downstream of the current rectifier 96 and safeguards the components 126, 150, 156 and 162 (explained further below) which are connected downstream in the current flow to the traction battery 20.

In the embodiment (ii) in which the first and second AC voltage inputs 98 and 100 of the current rectifier 96 are electrically conductively connected switchably to one another via the actuable second switch 186 of the kill switch 172 in accordance with the embodiment (ii), the kill switch 172 comprises a second overcurrent protection device 180, 180', which has a first and a second connection 182 and 184, and in addition comprises the actuable, second switch 186, which has a first and a second connection 188 and 190.

In the embodiment (ii), in a first possible installation position of the second overcurrent protection device 180, the first connection 182 thereof is electrically conductively connected to the first AC voltage input port 88 of the current rectifier device 86, and the second connection 118 of said second overcurrent protection device is electrically conductively connected to the first AC voltage input 98 of the current rectifier 96 and the first connection 188 of the second actuable switch 186. In addition, the first connection 188 of the second switch 186 is electrically conductively connected to the first AC voltage input 98 of the current rectifier 96, and the second connection 190 of said second switch is electrically conductively connected to the second AC voltage input 100 of the current rectifier 96 and the second AC voltage input port 90 of the current rectifier device 86.

In the embodiment (ii), in a second possible installation position of the second overcurrent protection device 180', the first connection 182 thereof is electrically conductively connected to the second AC voltage input port 90 of the current rectifier device 86, and the second connection 118 of said second overcurrent protection device is electrically conductively connected to the second AC voltage input 100 of the current rectifier 96 and the second connection 190 of the second actuable switch 186. In addition, the first connection 188 of the second switch 186 is electrically conductively connected to the first AC voltage input 98 of the current rectifier 96 and the first AC voltage input port 88 of the current rectifier device 86, and the second connection 190 of said second switch is electrically conductively connected to the second connection of the second overcurrent protection device 180' and the second AC voltage input 100 of the current rectifier 96.

The kill switch 172 in the installation position (ii) is therefore connected upstream of the current rectifier 96 and safeguards the current rectifier 96 connected downstream in the current flow to the traction battery 20 and the further downstream components 126, 150, 156 and 162 (explained further below).

A kill switch 106, 172, 66 or 46 in its respective embodiment (i), (ii), (iii) or (iv) is designed in such a way that when its associated actuable switch 120, 180, 80 or 60, in its respective installation position (i), (ii), (iii) or (iv), is switched over from an open (i.e. off) state into a closed (i.e. on) state, a charge current is dissipated through the overcurrent protection device 114 or 114', 180 or 180', 74 or 74' or 54 or 54' of the kill switch in its respective embodiment by the assigned closed switch substantially without any resistance. As a result, the charge current increases up to beyond a protection threshold value of the overcurrent protection device. As a result, the overcurrent protection device responds and transfers from a closed (i.e. on) state into an open (i.e. off) state. As a result, the charge current is interrupted. Such a triggerable or actuable charge current interruption can be used in an emergency shutdown system, as will be described in more detail further below.

The current rectifier 96 and the kill switch 106 in the installation position (i) or the kill switch 180 in the installation position (ii) are components of an electrical rectifier device 86 as shown in FIG. 2. This rectifier device 86 has a first and a second AC voltage input port 88 and 90 on the input side and a first and a second DC voltage output port 92 and 94 on the output side. The first AC voltage input port 88 is electrically conductively connected to the first AC voltage input 98 of the current rectifier 96, and the second AC voltage input port 90 is electrically conductively connected to the second AC voltage input 100 of the current rectifier 96. The first DC voltage output port 92 is electrically conductively connected to the first DC voltage output 102 of the current rectifier 96, and the second DC voltage output port 94 is electrically conductively connected to the second DC voltage output 104 of the current rectifier 96.

The electrical rectifier device 86 comprises a control and monitoring (C&M) device 192, which can implement a multiplicity of monitoring, control and circuit functions.

Inter alia, the electrical rectifier device 86 or the control and monitoring (C&M) device 192 contained therein is designed to switch over a kill switch 46, 66, 106 or 172 in its respective installation position from a closed, i.e. on, state into an open, i.e. off, state. The switchover into or triggering of the on state takes place when, in response to a request to terminate the charging operation which is directed and transmitted from the C&M device 192 to an external charging device 220, feedback from the charging device 220 with confirmation of the fact that the charging operation has been terminated does not arrive at the C&M device 192 within a predetermined period of time, which begins with the time of the transmission of the request.

Furthermore, the C&M device 192 is designed to implement one or more of the following functions: monitoring a charge voltage, a charge current and/or a temperature of the traction battery 20; monitoring a temperature of the current rectifier 96 and/or a temperature of an electric shock protection discharge resistor 164; monitoring a state signal generated by the charging device which is indicative of whether a correct state or correct operation of the charging device 220 is present or not; monitoring an interlock signal, which is routed on a first and second interlock signal line 200 and 201, which connects the C&M device (192) to a plug-type connector on the rectifier device side containing the first and second AC voltage input ports (88, 90), and is indicative of whether an electrical plug-type connection has been produced between the first and second output ports 30 and 32, on the one hand, and the first and second AC voltage input ports 88 and 90, on the other hand, or not; and monitoring one or more state signals fixed in advance which are indicative of whether correct operation or a correct state of the electric vehicle 14 or correct operation or a correct state of a generating set of the electric vehicle 14 is present or not. Such state signals are supplied to the C&M device 192 via a vehicle bus system 212, to which the C&M device 192 is connected.

The C&M device 192 is designed to transmit a request signal to terminate the charging operation which is directed to a charging device 220 wirelessly when one of the above-mentioned monitoring functions detects an incorrect state or incorrect operation.

The electrical rectifier device 86 furthermore comprises a first filter device 126 comprising a first and a second input 128 and 130 and a first output 132. The first input 128 of the first filter device 126 is electrically conductively connected indirectly, via the second overcurrent protection device 114, as can be seen from FIGS. 2 and 3, or directly (not shown) to the first DC voltage output 102 of the current rectifier 96, and the first output 132 of the first filter device 126 is electrically conductively connected directly (not shown) or indirectly, in particular via the downstream components 150, 156 and 162 of the C&M device 192, to the first DC voltage output port 92 of the electrical rectifier device 86. The first filter device 126 filters any first AC components which even pass, by means of external interference, through a magnetically shielding housing sheath (not shown) of the vehicle-side charging system device 26, including the electromagnetic emission from the stationary charging system device 220, from the direct current desired at the first output 132 out of the direct current desired on the output side of the current rectifier 96. The first filter device 126 serves the purpose of conditioning the output voltage of the current rectifier 96 such that the vehicle battery 20 can be supplied a DC voltage signal which is as "smooth" as possible, i.e. is as continuous as possible over the course of time.

The electrical rectifier device 86 furthermore comprises a second filter device 150 comprising a first and a second connection 152 and 154. The first connection 152 is electrically conductively connected directly (not shown) or indirectly, in particular via the downstream components 156 and 162 of the C&M device 192, to the first DC voltage output port 92 of the electrical rectifier device 86, and the second connection 154 is electrically conductively connected to ground (not shown) or indirectly, in particular via the downstream components 156 and 162 of the C&M device 192, to the second DC voltage output port 94 of the electrical rectifier device 86. The second filter device 150 filters any remaining second frequency components from the direct current desired at the first connection 152 out of the direct current desired on the output side of the first filter device 126. The second filter device 150 can have a so-called filter capacitor, which can have a high capacitance value and can effect additional or alternative signal smoothing, in respect of the first filter device 126.

The electrical rectifier device 86 furthermore comprises a voltage measurement device 156 comprising a first and a second connection 158 and 160. The first connection 158 is electrically conductively connected directly (not shown) or indirectly, for example via the downstream component 162 of the C&M device 192, to the first DC voltage output port 92 of the electrical rectifier device 86 and the first terminal 22 of the traction battery 20. The first connection 158 is electrically conductively connected indirectly via a fourth overcurrent protection device 180 to the first DC voltage output 102 of the current rectifier 96, as can be seen from FIGS. 2 and 3. The second connection 160 can be electrically conductively connected to ground (not shown) or to the second terminal 24 of the traction battery 20. The voltage measurement device 156 serves the purpose of measuring a voltage state (charge voltage or high voltage) of the traction battery 20 and of supplying a measurement signal, which represents the measured voltage value, over a voltage measurement signal line 157 (illustrated as a dashed line in FIG. 3) to an evaluation part (not shown) of the C&M device 192.

The electrical rectifier device 86 furthermore comprises an electric shock protection device 162, which comprises an electric shock protection discharge resistor 164 and an actuable switch 166 which is connected in series therewith and assigned thereto. This series circuit has a first connection 168 and a second connection 170 opposite said first connection. The first connection 168 is electrically conductively connected to the first DC voltage output port 92 of the electrical rectifier device 86. The second connection 170 can be electrically conductively connected to ground (not shown) or to the second DC voltage output port 94 of the electrical rectifier device 86. The actuable switch 166 is connected to a control part (not shown) of the C&M device 192 and actuable via a switch control line 167. If the switch 166 is closed in response to a switching signal from the control part of the C&M device 192, a touch voltage or an overvoltage state can be decayed in a controlled manner at the output of the rectifier device once the charging operation has come to an end via the electric shock protection discharge resistor 164, whose value has been selected in a suitable manner.

The electrical rectifier device 86 furthermore comprises an interlock detection device 194. This is designed to supply a so-called interlock signal to the C&M device 192 which is indicative of whether an electrical plug-type connection has been produced between the first and second output ports 30 and 32 of the first LC resonant circuit 28 on the one hand, and the first and the second AC voltage input ports 88 and 90 of the electrical rectifier device 86, on the other hand, or not. The electrical plug-type connection is formed by a first plug-type connector (not shown), which is fastened, for example on a housing of the rectifier device 86, contains the first and second AC voltage input ports 88 and 90 and is in the form of a female connector, for example, and a second plug-type connector (not shown), which contains the first and second output ports 30 and 32 of the first LC resonant circuit 28 and is in the form of a male connector, for example. The interlock detection device 194 comprises a first and a second connection 196 and 198, which can be short-circuited, i.e. electrically conductively connected, via a short-circuiting mechanism (not shown). This short-circuiting mechanism comes into effect when the first and second plug-type connectors of the electrical plug-type connection are connected correctly to one another or when the first plug-type connector (not shown), which comprises at least a first pin, which forms the first output port 30 of the first LC resonant circuit 28, and a second pin, which forms the second output port 32 of the first LC resonant circuit 28, is correctly connected to, for example pushed into, the second plug-type connector (not shown), which is assigned to this first plug-type connector. The second plug-type connector comprises at least a first connection, which forms the first AC voltage input port 88 of the rectifier device 86 and can receive the first pin, and a second connection, which forms the second AC voltage input port 90 of the rectifier device 86 and can receive the second pin. If the first plug-type connector has been connected to (inserted into) the second plug-type connector correctly, a circuit extending from the C&M device 192 via a first interlock signal line 200, the first connection 196, the short-circuiting mechanism, the second connection 198 and a second interlock signal line 202 back to the C&M device 192, is closed, which is interpreted by the C&M device 192 such that the electrical plug-type link between the first LC resonant circuit 28 and the rectifier device 86 or the current rectifier 96 has been produced. If the first plug-type connector has not been connected to (inserted into) the second plug-type connector, the circuit is interrupted owing to the short-circuiting mechanism, which is correspondingly interpreted by the C&M device 192.

The electrical rectifier device 192 furthermore comprises a first temperature measurement device 202. Said first temperature measurement device is designed and arranged to measure a temperature of the current rectifier 96 and to supply a first temperature measurement signal to the evaluation part (not shown) of the C&M device 192 via a measurement signal line 204, which temperature measurement signal is indicative of the temperature of the current rectifier 96. By means of the first temperature measurement device 202 and by evaluation of the first temperature measurement signal, in particular by comparison of this measurement signal with a predetermined, first temperature threshold value, the evaluation part (not shown) of the C&M device 192 can detect whether the temperature of the current rectifier 96 has a correct value or an elevated value, which can indicate overheating or overload of the current rectifier 96. In response to the detection of an elevated temperature value (a temperature value above the threshold value), the control part (not shown) of the C&M device 192 can transmit a request signal to the charging device 220 to reduce the charge power or to interrupt the charging operation, for example, and if the charging device 220 does not confirm the reduction or interruption within a predetermined period of time, can interrupt the current flow in the circuit apparatus 26 by activation of the first or the third kill switch 46 or 66.

The electrical rectifier device 192 furthermore comprises a second temperature measurement device 206. This is designed and arranged to measure a temperature of the electric shock protection discharge resistor 164 and to supply a second temperature measurement signal which is indicative of the temperature of the electric shock protection discharge resistor 164 to the evaluation part (not shown) of the C&M device 192 via a measurement signal line 208. By means of the second temperature measurement device 206 and by evaluation of the second temperature measurement signal, in particular by the comparison of this measurement signal with a predetermined, second temperature threshold value, the evaluation part (not shown) of the C&M device 192 can detect whether the temperature of the electric shock protection discharge resistor 164, in the event of activated discharge of a touch voltage or an overvoltage state, has a correct value or an elevated value, which can indicate overheating or overload of the electric shock protection discharge resistor 164 and therefore a faulty state. This could indicate that (emergency) shutdown has only been completed partially and the stationary charging system device 220 is still charging with a possibly low power. In response to the detection of an elevated temperature value (a temperature value above the threshold value), the control part (not shown) of the C&M device 192 can open the actuable switch 166 and thus interrupt the discharge via the electric shock protection discharge resistor 164.

The electrical rectifier device 192 furthermore comprises a bus port 210 and an interface 214, which is connected between the C&M device 192 and the bus port 210 or is integrated in the C&M device 192 and via which the C&M device 192 is connected to the bus port 210 and via said bus port to a vehicle bus system 212. Additional vehicle system information, in particular an incorrect, safety-relevant state or operating state of any component of the electric vehicle 14 provided outside the battery charging system 10, can be supplied to the C&M device 192 from the vehicle sensor system via the vehicle bus system 212. On the basis of such vehicle system information as well, the C&M device 192 can switch over one of the kill switches 46, 66, 106 or 172 to the interrupted state and therefore interrupt the (charge) current flow in the circuit apparatus 26.

A respective actuable switch 60, 80, 120 or 186 of a kill switch 46, 66, 106 or 172 in a respective installation position and/or the actuable switch 166 of the electric shock protection device 162 can be a semiconductor-based switch or a mechanical switch. Both variant configurations of an actuable switch are technically sophisticated and relatively inexpensive elements, in comparison with the components 28, 96, 126, 150, 156 to be protected and the traction battery 20.

A respective overcurrent protection device 54, 74, 114 or 180 of a kill switch 46, 66, 106 or 172 in a respective installation position can comprise a fuse or a temperature-dependent, reversible interruption element. Both variant configurations of an overcurrent protection device are likewise technically sophisticated and relatively inexpensive elements, in comparison with the components 28, 96, 126, 150, 156 to be protected and the traction battery 20.

The stationary charging system device 220 is designed and has corresponding means for receiving a request signal output by the vehicle-side charging system device 26 and evaluating the state thereof. After a time after which the state of the signal can be interpreted as a request to the stationary charging system device 220 to terminate a charging operation, the stationary charging system device 220 can terminate the charging operation within a predetermined period of time by ending the transmission of energy and transmit a confirmation signal which is indicative of the fact that the charging operation has been terminated.

The stationary charging system device 220 comprises a grid supply connection 244, a control device 242 and a second LC resonant circuit 222. The stationary charging system device 220 draws electrical energy from an, in particular the public, electricity supply grid via the grid supply connection 244. The control device 242 is designed, inter alia, to retransmit electrical energy to the second LC resonant circuit 222 or to interrupt this retransmission, or a current flow.

The second LC resonant circuit 222 comprises a transmission coil 224 for outputting electromagnetic energy, a capacitor 230 assigned to the transmission coil 224 and an actuable device 236 having a switching function, such as an actuably switchable inverter, for example (not shown). By suitable dimensioning of the capacitance of the capacitor 230 and the inductance of the transmission coil 224, a resonant frequency of the second LC resonant circuit 222 is set to approximately 160 kHz, and an alternating current with this frequency is applied to the transmission coil 224.

The device 236 having a switching function is arranged with the transmission coil 224 and the capacitor 230 in series, as shown in FIG. 2, or between the transmission coil 224 and the capacitor 230. Said device can be switched over by the control device 242 from a closed, i.e. on, state into an open, i.e. off, state, and vice versa. The control device 242 can evaluate information output by a vehicle-side charging system device 26 via a radio link or interpret communications and, as a function thereof, set charging parameters, including the intensity of the electromagnetic power transmitted, or switch on or interrupt the charging operation. The stationary charging system device 220 is designed to switch over the device 236 having the switching function from the closed state to the open state within the predetermined time and thus to interrupt the charging operation once it has interpreted a state of a request signal from the vehicle-side charging system device 26 as a request to terminate the charging operation.

A reception frequency of the first LC resonant circuit 28 is determined by the dimensioning of the inductance of the first coil 34 and the capacitance of the first capacitor 40. The resonant frequency (transmission frequency) of the second LC resonant circuit 222, as already mentioned, is determined by the dimensioning of the inductance of the second coil 224 and the capacitance of the second capacitor 230, and is set to a value of 160 kHz, for example. The reception frequency of the first LC resonant circuit 28 is matched to the transmission frequency of the second LC resonant circuit 222. Thus, the first LC resonant circuit 28 can receive a maximum of electromagnetic energy which is emitted by the second LC resonant circuit 222 via a wireless link 12.

The first coil 34 of the vehicle-side charging system device 26 can be magnetically coupled to the second coil 224 of the stationary charging system device 220, for example by virtue of the two coils 34 and 224 having a, for example, ring-shaped, ferromagnetic yoke passing through said coils, which yoke favors magnetic field guidance. In this case, the wireless link 12 is an induction-based link, with the second coil 224 as primary coil and the first coil 40 as secondary coil, and the battery charging system 10 comprises a known induction charging system for electric vehicles.

LIST OF REFERENCE SYMBOLS

10 Battery charging system
12 Wireless link
14 Electric vehicle
16 Electric traction motor
20 Traction battery
22 First port
24 Second port
26 Vehicle-side charging system device
28 First LC resonant circuit
30 First output port
32 Second output port
34 First coil
36 First connection
38 Second connection
40 First capacitor
42 First connection
44 Second connection
46 Kill switch in installation arrangement in accordance with embodiment (iv)
54, 54' Fourth overcurrent protection device
56 First connection
58 Second connection
60 Actuable, fourth switch
62 First connection
64 Second connection
66 Kill switch in installation arrangement in accordance with embodiment (iii)
74, 74' Third overcurrent protection device
76 First connection
78 Second connection
80 Actuable, third switch
82 First connection
84 Second connection
86 Rectifier device
88 First AC voltage input port
90 Second AC voltage input port
92 First DC voltage output port
94 Second DC voltage output port
96 Current rectifier
98 First AC voltage input
100 Second AC voltage input
102 First DC voltage output
104 Second DC voltage output
106 Kill switch in installation arrangement in accordance with embodiment (i)
114, 114' First overcurrent protection device
116 First connection
118 Second connection
120 Actuable, first switch 122 First connection
124 Second connection
126 First filter device
128 First input
130 Second input
132 First output
136 Second coil
138 First connection
140 Second connection
142 Ground
144 Second filter device
146 First connection
148 Second connection
150 Third capacitor
152 First connection
154 Second connection
156 Voltage measurement device
157 Voltage measurement signal line
158 First connection
160 Second connection
162 Electric shock protection device
164 Electric shock protection discharge resistor
166 Actuable switch
167 Switch control line
168 First connection
170 Second connection
172 Kill switch in installation arrangement in accordance with embodiment (ii)
180, 180' Second overcurrent protection device
182 First connection
184 Second connection
186 Actuable, second switch
188 First connection
190 Second connection
192 Control and monitoring device
194 Interlock detection device
196 First connection
198 Second connection
200 First interlock signal line
201 Second interlock signal line
202 First temperature measurement device
204 Measurement signal line for first temperature measurement signal
206 Second temperature measurement device
208 Measurement signal line for second temperature measurement signal
210 Bus port
212 Vehicle bus system
214 Interface
220 Stationary charging system device
222 Second LC resonant circuit
224 Transmission coil
226 First connection
228 Second connection
230 Capacitor
232 First connection
234 Second connection
236 Device having switching function
238 First connection
240 Second connection
242 Control device
244 Grid supply connection

What is claimed is:

1. A vehicle-side, electronic charging system device of a wireless battery charging system, the vehicle-side, electronic charging system device being configured to receive, convert, and feed energy to a rechargeable traction battery for supplying electrical energy to an electric traction motor of an electric vehicle, wherein the traction battery is configured to be charged by an external charging system device via a wireless link and the vehicle-side charging system device, the vehicle-side charging system device comprising:
a first LC resonant circuit comprising:
a first coil in the form of a reception coil configured to receive electromagnetic energy and having a first connection and a second connection,
a first capacitor,
a first output port, and
a second output port,
wherein the first output port is electrically conductively connected to the second output port via the first capacitor and the first coil, and
a current rectifier having a first AC voltage input and a second AC voltage input on an input side of the current rectifier, and a first DC voltage output and a second DC voltage output on an output side of the current rectifier,
wherein the current rectifier is designed to convert an AC electric voltage applied between the first and second AC voltage inputs into a DC electric voltage which between the first and second DC voltage outputs,
wherein the first AC voltage input is directly or indirectly electrically conductively connectable to the first capacitor via the first output port, and the second AC voltage input is directly or indirectly electrically conductively connectable to the first coil via the second output port,
wherein the first DC voltage output is directly or indirectly electrically conductively connectable to a first port of the traction battery, and the second DC voltage output is directly or indirectly electrically conductively connectable to a second port of the traction battery, and
wherein at least one of the following pairs of elements are electrically conductively connectable switchably to one another via an actuable switch of a kill switch:
the first and the second output ports of the first LC resonant circuit, or
the first and the second connections of the first coil.

2. The charging system device of claim 1, wherein:
the kill switch has an overcurrent protection device and an actuable overcurrent switch, and
the first and the second output ports of the first LC resonant circuit are electrically conductively connectable switchably to one another via the actuable overcurrent switch, and
the overcurrent protection device is connected in series via a link between the first connection of the first coil and the first output port, or the overcurrent protection device is connected in series via a link between the second connection of the first coil and the second output port of the first LC resonant circuit.

3. The charging system device of claim 1, wherein:
the kill switch has an overcurrent protection device and an actuable overcurrent switch, and
the first and second connections of the first coil are electrically conductively connectable switchably to one another via the actuable overcurrent switch, and
the overcurrent protection device is connected in series via a link between the first connection of the first coil and the first output port or the overcurrent protection device is connected in series via a link between the second connection of the first coil and the second output port of the first LC resonant circuit.

4. The charging system device of claim 1, wherein the kill switch is configured such that when the actuable switch of the kill switch is switched from an open state to a closed state, a charging current is substantially dissipated through an overcurrent protection device by the closed switch without resistance and, as a result, increases up to above a protection device threshold value of the overcurrent protection device, with the result that the overcurrent protection device responds and transfers from a closed state to an open state and the charging current is thus interrupted.

5. The charging system device of claim 1, wherein the electrical rectifier device has a control and monitoring device configured to switch a respective kill switch from an open state to a closed state when, in response to a request to terminate the charging operation which is directed and transmitted from the control and monitoring device to an external charging system device, feedback from the external charging system device with confirmation that the charging operation has been terminated does not arrive at the control and monitoring device within a predetermined period of time that begins at a time of the transmission of the request.

6. The charging system device of claim 1, wherein the control and monitoring device is configured to perform one or more of the following functions:
monitoring a charge voltage of the traction battery,
monitoring a charge current of the traction battery,
monitoring a temperature of the traction battery,
monitoring a temperature of the current rectifier,
monitoring a temperature of an electric shock protection discharge resistor,
monitoring a state signal generated by the charging device indicative of whether or not a correct state or correct operation of the charging device is present,
monitoring an interlock signal routed on a first and second interlock signal line that connects the control and monitoring device to a plug-type connector on the rectifier device side that contains the first and second AC voltage input ports, and is indicative of whether or not an electrical plug-type connection has been produced (a) between the first and second output ports, and (b) between the first and second AC voltage input ports, or
monitoring one or more predefined state signals that are indicative of whether or not correct operation or a correct state of the electric vehicle or correct operation or a correct state of a generating set of the electric vehicle is present, and which are supplied to the control and monitoring device via a vehicle bus system.

7. The charging system device of claim 6, wherein the control and monitoring device is configured to wirelessly transmit a request signal to terminate a charging operation which is directed to a charging device in response to the control and monitoring device detecting an incorrect state or incorrect operation.

8. The charging system device of claim 1, wherein the actuable switch of the kill switch or an actuable switch of an DC-link discharge device comprises a semiconductor-based switch or a mechanical switch.

9. The charging system device of claim 1, wherein an overcurrent protection device of the kill switch includes a fuse or a temperature-dependent, reversible interruption element.

\* \* \* \* \*